US011441497B2

(12) United States Patent
Yonekura et al.

(10) Patent No.: US 11,441,497 B2
(45) Date of Patent: Sep. 13, 2022

(54) INTERNAL COMBUSTION ENGINE CONTROL METHOD AND INTERNAL COMBUSTION ENGINE CONTROL DEVICE

(71) Applicant: NISSAN MOTOR CO., LTD., Yokohama (JP)

(72) Inventors: Kengo Yonekura, Kanagawa (JP); Hirofumi Tsuchida, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 127 days.

(21) Appl. No.: 16/963,571

(22) PCT Filed: Jan. 23, 2018

(86) PCT No.: PCT/JP2018/001877
§ 371 (c)(1),
(2) Date: Jul. 21, 2020

(87) PCT Pub. No.: WO2019/145991
PCT Pub. Date: Aug. 1, 2019

(65) Prior Publication Data

US 2021/0054794 A1 Feb. 25, 2021

(51) Int. Cl.
*F02D 41/00* (2006.01)
*F02D 13/02* (2006.01)
(Continued)

(52) U.S. Cl.
CPC ..... *F02D 41/0007* (2013.01); *F02D 13/0234* (2013.01); *F02D 41/1454* (2013.01);
(Continued)

(58) Field of Classification Search
CPC ............. F02D 13/0234; F02D 41/0007; F02D 41/1454; F02D 41/1475; F02D 41/3029;
(Continued)

(56) References Cited

U.S. PATENT DOCUMENTS 6,089,206 A * 7/2000 Suzuki .................. F02D 41/307 123/295
6,318,083 B1 * 11/2001 Machida ................ F02D 23/00 60/601
(Continued)

FOREIGN PATENT DOCUMENTS

FR 2784944 A1 4/2000
JP 2006-16973 A 1/2006
(Continued)

*Primary Examiner* — John M Zaleskas
(74) *Attorney, Agent, or Firm* — Foley & Lardner LLP

(57) ABSTRACT

During a transient period, the opening degree of a throttle valve (throttle opening degree) is varied from a steady-period target throttle opening degree in a region A1 toward a valve closing side by a predetermined amount ΔP, and is thereafter controlled so as to become a steady-period target throttle opening degree in the region A1. The transient period is a transient period in which the operation state is shifted from a region B2 in which an air-fuel ratio in a supercharged state becomes a predetermined lean air-fuel ratio to a region A1 in which the air-fuel ratio in a non-supercharged state becomes a predetermined rich air-fuel ratio richer than the lean air-fuel ratio. In this transient period, by reducing the air amount in a cylinder, the combustion torque of an internal combustion engine is suppressed, and consequently; a torque overshoot can be suppressed.

3 Claims, 8 Drawing Sheets

(51) Int. Cl.
*F02D 41/14* (2006.01)
*F02D 41/30* (2006.01)

(52) U.S. Cl.
CPC ....... *F02D 41/307* (2013.01); *F02D 41/3029* (2013.01); *F02D 2041/002* (2013.01); *F02D 2200/101* (2013.01)

(58) Field of Classification Search
CPC ............. F02D 41/307; F02D 2041/002; F02D 2200/101; F02D 2250/21
See application file for complete search history.

(56) References Cited

U.S. PATENT DOCUMENTS

| | | | | |
|---|---|---|---|---|
| 2001/0035153 | A1* | 11/2001 | Russell | F02D 13/0215 123/295 |
| 2004/0016419 | A1* | 1/2004 | Satou | F02D 41/0007 123/492 |
| 2008/0234917 | A1* | 9/2008 | Hatano | F02D 41/401 701/103 |
| 2010/0071658 | A1* | 3/2010 | Soejima | F02B 37/16 123/406.19 |
| 2014/0224227 | A1* | 8/2014 | Yoshizaki | F02D 41/0007 123/559.1 |
| 2015/0167578 | A1* | 6/2015 | Hotta | F02D 13/0207 701/104 |
| 2015/0353092 | A1* | 12/2015 | Hotta | B60W 10/101 701/54 |
| 2015/0361906 | A1* | 12/2015 | Nagai | F02D 41/1475 123/568.11 |
| 2016/0102636 | A1* | 4/2016 | Styles | F02D 41/006 123/568.21 |
| 2016/0115892 | A1* | 4/2016 | Tanaka | F02D 41/0002 123/406.46 |
| 2016/0123252 | A1* | 5/2016 | Yoshizaki | F02D 41/307 123/436 |
| 2016/0123253 | A1* | 5/2016 | Saito | F02D 41/045 123/406.23 |
| 2016/0153373 | A1* | 6/2016 | Yoshizaki | F02D 41/1497 123/406.48 |
| 2016/0273494 | A1* | 9/2016 | Hotta | F02D 41/0032 |
| 2017/0074204 | A1* | 3/2017 | Takamiya | F02D 13/0242 |
| 2017/0342926 | A1* | 11/2017 | Sugihira | F02D 11/105 |
| 2017/0350338 | A1* | 12/2017 | Sugihira | F02D 23/02 |
| 2017/0363020 | A1* | 12/2017 | Okada | F02D 13/0219 |
| 2019/0093574 | A1* | 3/2019 | Muramatsu | F02B 37/18 |
| 2020/0398818 | A1* | 12/2020 | Nagamine | B60W 20/15 |
| 2021/0071601 | A1* | 3/2021 | Araki | F02D 41/0002 |
| 2021/0079869 | A1* | 3/2021 | Takayama | F02D 41/3041 |

FOREIGN PATENT DOCUMENTS

| | | | | | |
|---|---|---|---|---|---|
| JP | 2007218143 | A | * | 8/2007 | F02P 5/1504 |
| JP | 2015-151972 | A | | 8/2015 | |

* cited by examiner

INTERNAL COMBUSTION ENGINE CONTROL METHOD AND INTERNAL COMBUSTION ENGINE CONTROL DEVICE

TECHNICAL FIELD

The present invention relates to a method for controlling an internal combustion engine and to a device for controlling the internal combustion engine.

BACKGROUND TECHNOLOGY

In a patent document 1, a technology for eliminating torque shock at the time when an operation state of an internal combustion engine is shifted, and a combustion mode is switched from stratified combustion in which an air-fuel ratio is lean to homogeneous combustion in which the air-fuel ratio is rich is disclosed.

In the patent document 1, prior to the switching of a fuel injection mode from a fuel injection realizing the stratified combustion to a fuel injection realizing the homogeneous combustion, a throttle valve is operated to be closed by a predetermined amount. Then, in order to cancel out a rapid increase in engine torque at the time when the combustion mode is switched from the stratified combustion in which the air-fuel ratio is lean to the homogeneous combustion in which the air-fuel ratio is rich, ignition timing retard and the increase correction of a fuel injection amount are carried out. The increase correction of the fuel injection amount is carried out by a first one combustion cycle of each cylinder after the switching of the fuel injection mode by estimating an air amount remaining in each of the cylinders in which the fuel injection mode is switched.

However, the patent document 1 is not one for cancelling out a rapid increase in engine torque at the time when an operation state is changed from an operation state in which an air-fuel ratio in a supercharged state is lean to an operation state in which the air-fuel ratio in a non-supercharged state is rich.

That is, the patent document 1 is not one in which response delay of an intake pressure at the time when the operation state is changed from the operation state in which the air-fuel ratio in the supercharged state is lean to the operation state in which the air-fuel ratio in the non-supercharged state is rich is not considered.

There is a case where, due to the response delay of the intake pressure, during a transient period in which the operation state is changed from the operation state in which the air-fuel ratio in the supercharged state is lean to the operation state in which the air-fuel ratio in the non-supercharged state is rich, the intake pressure becomes higher than an exhaust pressure. In this case, pumping work occurs by an increase in an intake air amount during the transient period, and unintended overshoot of torque likely occurs.

That is, there is room for further improvement to cancelling out toque level difference at the time when the operation state is changed and the control state of the internal combustion engine is switched.

PRIOR ART DOCUMENT

Patent Document

Patent Document 1: Japanese Patent Application Publication 2006-16973

SUMMARY OF THE INVENTION

In an internal combustion engine of the present invention, during a transient period in which an operation state is shifted from a first operation state in which an air-fuel ratio in a supercharged state becomes a predetermined lean air-fuel ratio to a second operation state in which the air-fuel ratio in a non-supercharged state becomes a predetermined rich air-fuel ratio richer than the lean air-fuel ratio, an air amount in a cylinder is controlled such that by reducing the air amount in the cylinder so as to be an air amount smaller than an air amount realizing the rich air-fuel ratio, a torque overshoot of the internal combustion engine caused by pump work does not occur.

Consequently, during the transient period, by reducing the air amount in the cylinder, the combustion torque of the internal combustion engine is suppressed, thereby suppressing the overshoot of the torque.

MODE FOR IMPLEMENTING THE INVENTION

Figure 1:
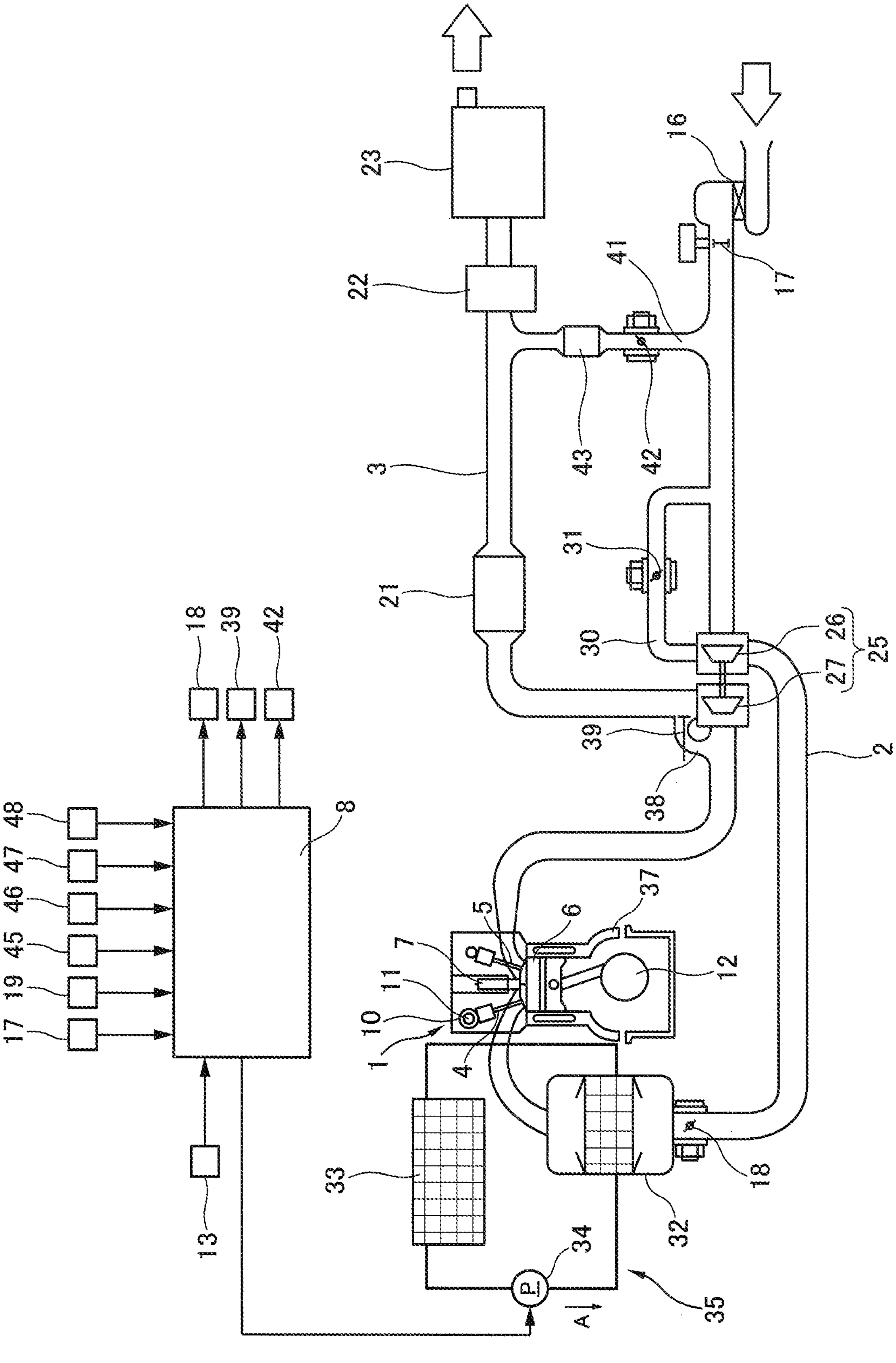
FIG. 1 is an explanatory view schematically showing a control device of an internal combustion engine according to the present invention.

In the following, one embodiment of the present invention will be explained in detail, based on the drawings. FIG. 1 is an explanatory view schematically showing a control device of an internal combustion engine 1.

For example, internal combustion engine 1 is a spark ignition type gasoline engine, and is mounted on a vehicle, such as a car, as a driving source. Internal combustion engine 1 includes an intake passage 2 and an exhaust passage 3. Intake passage 2 is connected to a combustion chamber 6 via an intake valve 4. Exhaust passage 3 is connected to combustion chamber 6 via an exhaust valve 5.

Internal combustion engine 1 has, for example, a cylinder direct injection type structure, and a fuel injection valve (not shown in the drawings) for injecting fuel into a cylinder and an ignition plug 7 are provided to each cylinder. The injection timing and the injection amount of the fuel injection valve and the ignition timing of ignition plug 7 are controlled by control signals from a control unit 8.

Internal combustion engine 1 includes, as a valve mechanism of intake valve 4, an intake-side variable valve mechanism 10 which is capable of varying the valve timing (opening-closing timing) of intake valve 4.

In addition, a valve mechanism on an exhaust valve side is a general direct-acting valve mechanism, and the phases of the lift operation angle and the lift central angle of exhaust valve 5 are always constant.

For example, intake-side variable valve mechanism 10 is one driven with hydraulic pressure, and is controlled by control signals from control unit 8. That is, control unit 8 corresponds to a control unit configured to control intake-side variable valve mechanism 10. Then, by control unit 8, the valve timing of intake valve 4 can be variably controlled. Intake-side variable valve mechanism 10 is configured so as to be capable of controlling the air amount in a cylinder by controlling the valve closing timing of intake valve 4. For example, in a case where the intake valve closing timing is delayed from the bottom dead center, the intake valve closing timing is delayed so as to be away from the bottom dead center, and thereby the air amount in a cylinder can be reduced. In addition, for example, in a case where the intake valve closing timing is advanced from the bottom dead center, the intake valve closing timing is advanced so as to be away from the bottom dead center, and thereby the air amount in a cylinder can be reduced. That is, intake-side variable valve mechanism 10 corresponds to an air amount control unit which is capable of variably controlling the air amount in a cylinder.

Intake-side variable valve mechanism 10 may be one which is capable of individually independently varying the opening timing and the closing timing of intake valve 4, or may be one which is capable of simultaneously delaying or advancing the opening timing and the closing timing. In the present embodiment, the latter one which delays or advances the phase of an intake-side camshaft 11 to a crankshaft 12 is used. In addition, although intake-side variable valve mechanism 10 is not limited to one which is driven with hydraulic pressure, it may be one which is electrically driven by, for example, a motor.

The valve timing of intake valve 4 is detected by an intake-side camshaft position sensor 13. Intake-side camshaft position sensor 13 is one to detect the phase of intake-side camshaft 11 to crankshaft 12.

Intake passage 2 is provided with an air cleaner 16 for collecting foreign matters in the intake air, an air flow meter 17 for detecting the amount of the intake air, and with an electric throttle valve 18 capable of controlling the intake air amount in a cylinder.

Air flow meter 17 includes thereinside a temperature sensor, so as to detect (measure) the intake air temperature at an intake introducing port. Air flow meter 17 is disposed on the downstream side of air cleaner 16.

Throttle valve 18 is one equipped with an actuator, such as an electric motor, and by a control signal from control unit 8, the opening degree of throttle valve 18 is controlled. Throttle valve 18 is disposed on the downstream side of air flow meter 17.

The opening degree of throttle valve 18 (throttle opening degree) is detected by a throttle opening sensor 19. The detection signal of throttle opening sensor 19 is input to control unit 8.

Exhaust passage 3 is provided with an upstream-side exhaust catalyst 21, such as a three-way catalyst, a downstream-side exhaust catalyst 22, such as a three-way catalyst, and with a muffler 23 as a silencer to reduce exhaust sound. Downstream-side exhaust catalyst 22 is disposed on the downstream side of upstream-side exhaust catalyst 21. Muffler 23 is disposed on the downstream side of downstream-side exhaust catalyst 22.

In addition, this internal combustion engine 1 includes a turbo supercharger 25 as a supercharger equipped with, on the same axis, a compressor 26 provided to intake passage 2 and a turbine 27 provided to exhaust passage 3. Compressor 26 is disposed between the upstream side of throttle valve 18 and the downstream side of air flow meter 17. Turbine 27 is disposed more on the upstream side than upstream-side exhaust catalyst 21.

An intake bypass passage 30 is connected to intake passage 2.

Intake bypass passage 30 is formed so as to communicate the upstream side to the downstream side of compressor 26 by bypassing compressor 26.

Intake bypass passage 30 is provided with an electric recirculation valve 31. Although recirculation valve 31 is normally closed, when throttle valve 18 is closed and the downstream side of compressor 26 becomes in a high pressure state, recirculation valve 31 is opened. Recirculation valve 31 is opened, and consequently, the intake air in the high pressure state on the downstream side of compressor 26 can be returned to the upstream side of compressor 26 via intake bypass passage 30. Recirculation valve 31 is controlled to be opened and closed by a control signal from control unit 8. In addition, as recirculation valve 31, not only one controlled to be opened and closed by control unit 8, but also a so-called check valve which is opened only when the pressure on the downstream side of compressor 26 becomes a predetermined pressure or higher can be used.

Moreover, intake passage 2 is provided with, on the downstream side of throttle valve 18, an intercooler 32 to improve volumetric efficiency by cooling the intake air compressed (pressurized) by compressor 26.

Intercooler 32 is disposed in a cooling path 35 for the intercooler (sub-cooling path), together with a radiator 33 for the intercooler (intercooler radiator) and an electric pump 34. Refrigerant (cooling water) cooled by radiator 33 can be supplied to intercooler 32.

Intercooler cooling path 35 is configured such that the refrigerant can circulate inside the path. Intercooler cooling path 35 is a cooling path independent of a main cooling path which is not shown in the drawings and in which cooling water for cooling a cylinder block 37 of internal combustion engine 1 circulates.

Radiator 33 is configured to cool the refrigerant inside intercooler cooling path 35 by heat exchange with outside air.

Electric pump 34 is one for circulating the refrigerant inside intercooler cooling path 35 in the direction shown by an arrow A by the driving thereof.

An exhaust bypass passage 38 connecting the upstream side with the downstream side of turbine 27 by bypassing turbine 27 is connected to exhaust passage 3. The downstream-side end of exhaust bypass passage 38 is connected to exhaust passage 3 at a position more on the upstream side than upstream-side exhaust catalyst 21. An electric waste gate valve 39 for controlling the flow rate of exhaust gas inside exhaust bypass passage 38 is disposed in exhaust bypass passage 38.

In addition, internal combustion engine 1 is one which is capable of performing exhaust gas recirculation (EGR) in which, as EGR gas, a part of exhaust gas is introduced (recirculated) from exhaust passage 3 to intake passage 2, and includes an EGR passage 41 which is branched from exhaust passage 3 so as to be connected to intake passage 2.

One end of EGR passage 41 is connected to exhaust passage 3 at a position between the upstream-side exhaust catalyst 21 and downstream-side catalyst 22, and the other end thereof is connected to intake passage 2 at a position which is the downstream side of air flow meter 17 and is the upstream side of compressor 26. EGR passage 41 is provided with an electric EGR valve 42 for controlling the flow rate of the EGR gas inside EGR passage 41, and with an EGR cooler 43 which is capable of cooling the EGR gas. The opening-closing operation of EGR valve 42 is controlled by control unit 8 as a control unit.

In addition to the above-mentioned detection signals of intake-side camshaft position sensor 13, air flow meter 17 and throttle opening sensor 19, detection signals of sensors, such as a crank angle sensor 45 which is capable of detecting engine speed together with the crank angle of crankshaft 12, an accelerator opening sensor 46 for detecting the depression amount of an accelerator pedal (not shown in the drawings), a supercharging pressure sensor 47 for detecting supercharging pressure, and an exhaust pressure sensor 48 for detecting exhaust pressure, are input to control unit 8.

Supercharging pressure sensor 47 is disposed at a position more on the downstream side than intake cooler 32 in intake passage 2, for example, it is disposed in a collector part, to detect intake pressure at the disposed position.

Exhaust pressure sensor 48 is disposed at a position more on the upstream side than turbine 27 in exhaust passage 3, to detect exhaust pressure at the disposed position.

Control unit 8 is configured to calculate a required load (engine load) of internal combustion engine 1 by using the detection value of accelerator opening sensor 46.

Then, based on those detection signals, control unit 8 performs the control of the ignition timing and the air-fuel ratio of internal combustion engine 1 and the control of the exhaust gas recirculation (EGR control) in which a part of exhaust gas is recirculated from exhaust passage 3 to intake passage 2 by controlling the opening degree of EGR valve 42. In addition, control unit 8 also controls the driving of electric pump 34 and the opening degree of each of throttle valve 18 and waste gate valve 39.

Figure 2:
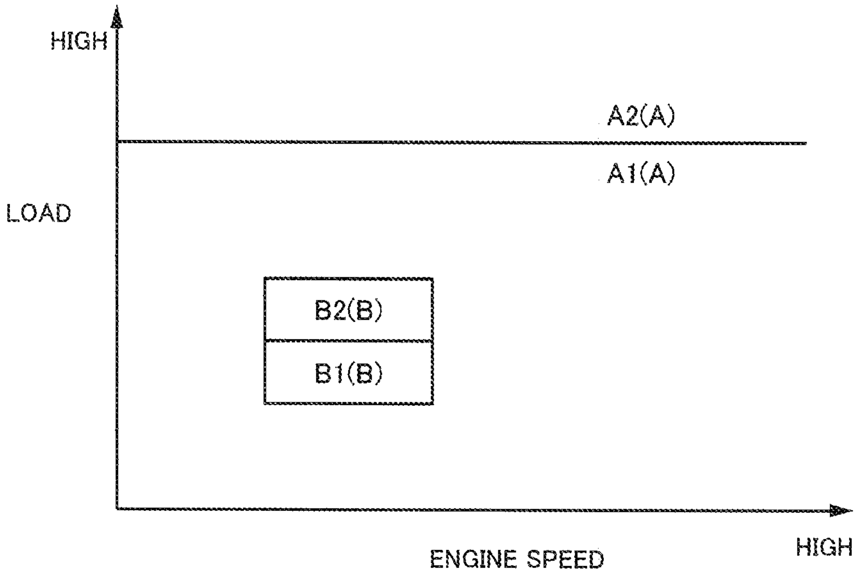
FIG. 2 is an explanatory view schematically showing a map used for calculating an air-fuel ratio.

Control unit 8 controls the air-fuel ratio of internal combustion engine 1, according to an operation state, by using an air-fuel ratio calculation map shown in FIG. 2. FIG. 2 is the air-fuel ratio calculation map stored in control unit 8, and the air-fuel ratio is allocated according to the engine load and the engine speed.

Control unit 8 controls the air-fuel ratio so as to be a theoretical air-fuel ratio in a predetermined first operation region. A, and in a predetermined second operation region B in which the engine speed is low and the engine load is low, the air-fuel ratio is controlled so as to be an air-fuel ratio leaner than the air-fuel ratio in first operation region A. That is, the air-fuel ratio in first operation region A corresponds to a predetermined rich air-fuel ratio, and the air-fuel ratio in second operation region B corresponds to a predetermined lean air-fuel ratio.

In other words, when the operation state of internal combustion engine 1 is in first operation region A that is a region other than second operation region B on the low engine speed and low engine load sides, a target air-fuel ratio is set such that an excess air ratio $\lambda$ becomes $\lambda=1$. In addition, when the operation state of internal combustion engine 1 is in second operation region B, the target air-fuel ratio is set such that the excess air ratio $\lambda$ approximately becomes $\lambda+2$.

Moreover, a region A1 on the low load side in first operation region A is a non-supercharging region in which the supercharging by turbo supercharger 25 is not performed. A region A2 on the high load side in first operation region A is a supercharging region in which the supercharging by turbo supercharger 25 is performed.

That is, region A1 corresponds to a second operation state in which the air-fuel ratio becomes an air-fuel ratio richer than the air-fuel ratio in second operation region B in a non-supercharged state.

In addition, a region B1 on the low load side in second operation region B is a non-supercharging region in which the supercharging by turbo supercharger 25 is not performed. A region B2 on the high load side in second operation region B is a supercharging region in which the supercharging by turbo supercharger 25 is performed.

That is, region B2 corresponds to a first operation state in which the air-fuel ratio becomes a predetermined lean air-fuel ratio in a supercharged state.

When the operation state is shifted from region B2 to region A1, since the air-fuel ratio is changed so as to be relatively rich, the air amount in a cylinder is controlled so as to be reduced.

During a transient period in which the operation state is shifted from region B2 in which the air-fuel ratio in the supercharged state becomes a lean air-fuel ratio to region A1 in which the air-fuel ratio in the non-supercharged state becomes an air-fuel ratio richer than the lean air-fuel ratio, it can be considered to control the opening degree of throttle valve 18 (throttle opening degree) to reduce the air amount in a cylinder.

Figure 3:
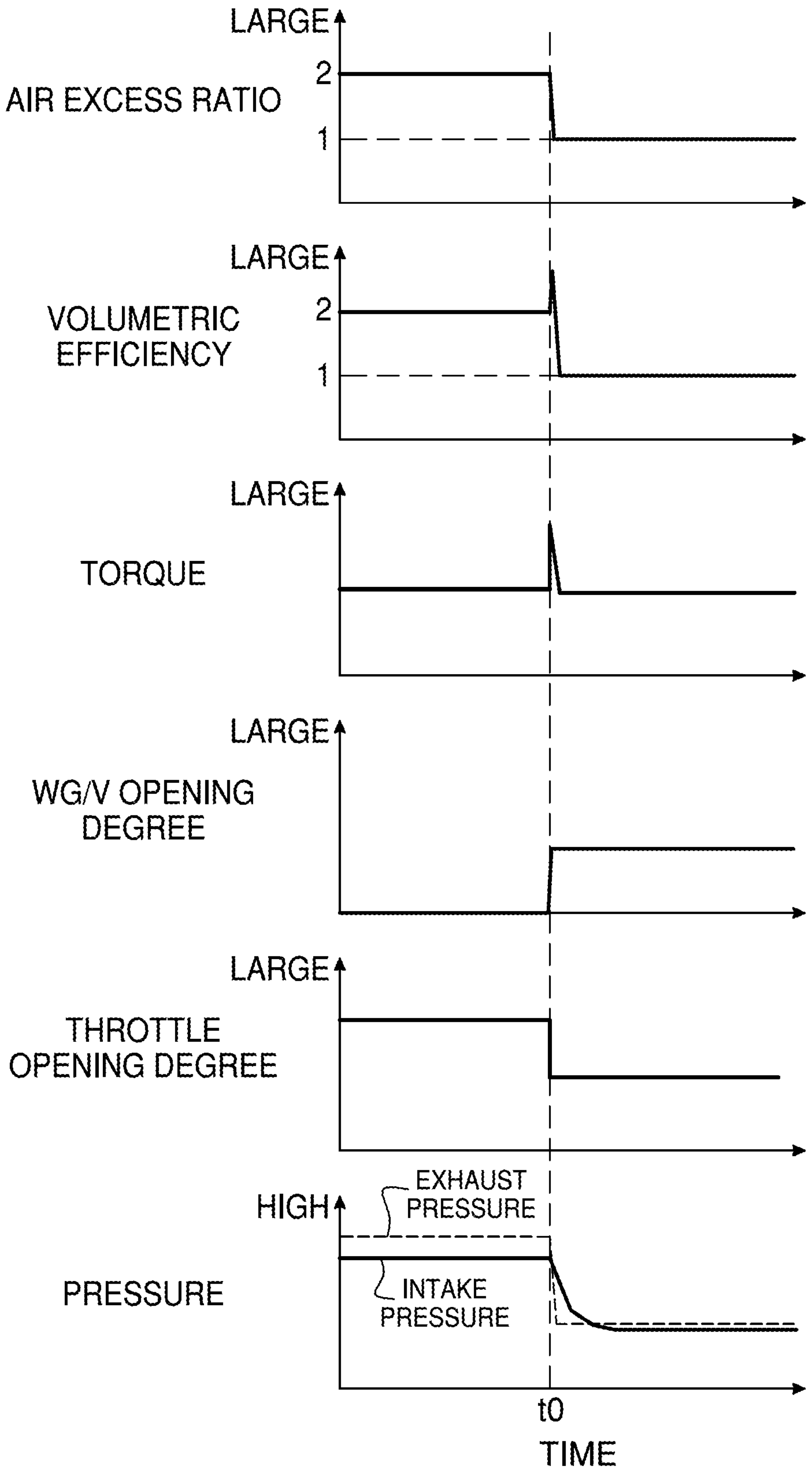
FIG. 3 is a timing chart showing changes in various parameters during a transient period in a comparative embodiment.

Specifically, for example, as shown in FIG. 3, the throttle valve 18 is moved toward the valve closing side such that the opening degree of throttle valve 18 (throttle opening degree) becomes a target throttle opening degree at the steady time in region A1, and waste gate valve 39 is fully opened. However, in this case, since the supercharging pressure at the time when the operation state is in region B2 remains, the response of the lowering of intake pressure by moving throttle valve 18 to the valve closing direction is delayed with respect to the response of the lowering of exhaust pressure by fully opening waste gate valve 39, and the intake pressure becomes higher than the exhaust pressure.

In this way, during the transient period in which the operation state is shifted from region B2 to region A1, when the intake pressure becomes higher than the exhaust pressure, pump work occurs in internal combustion engine 1, and a torque overshoot occurs.

FIG. 3 is a timing chart showing changes in various parameters during the transient period in which the operation state is shifted from region B2 to region A1 in a comparative embodiment.

In FIG. 3, at the timing of a time t0, the operation state is shifted from region B2 to region A1. Therefore, in FIG. 3, an excess air ratio, the opening degree of waste gate valve 39 (WG/V opening degree) and the throttle opening degree are all changed at the timing of time t0.

Figure 4:
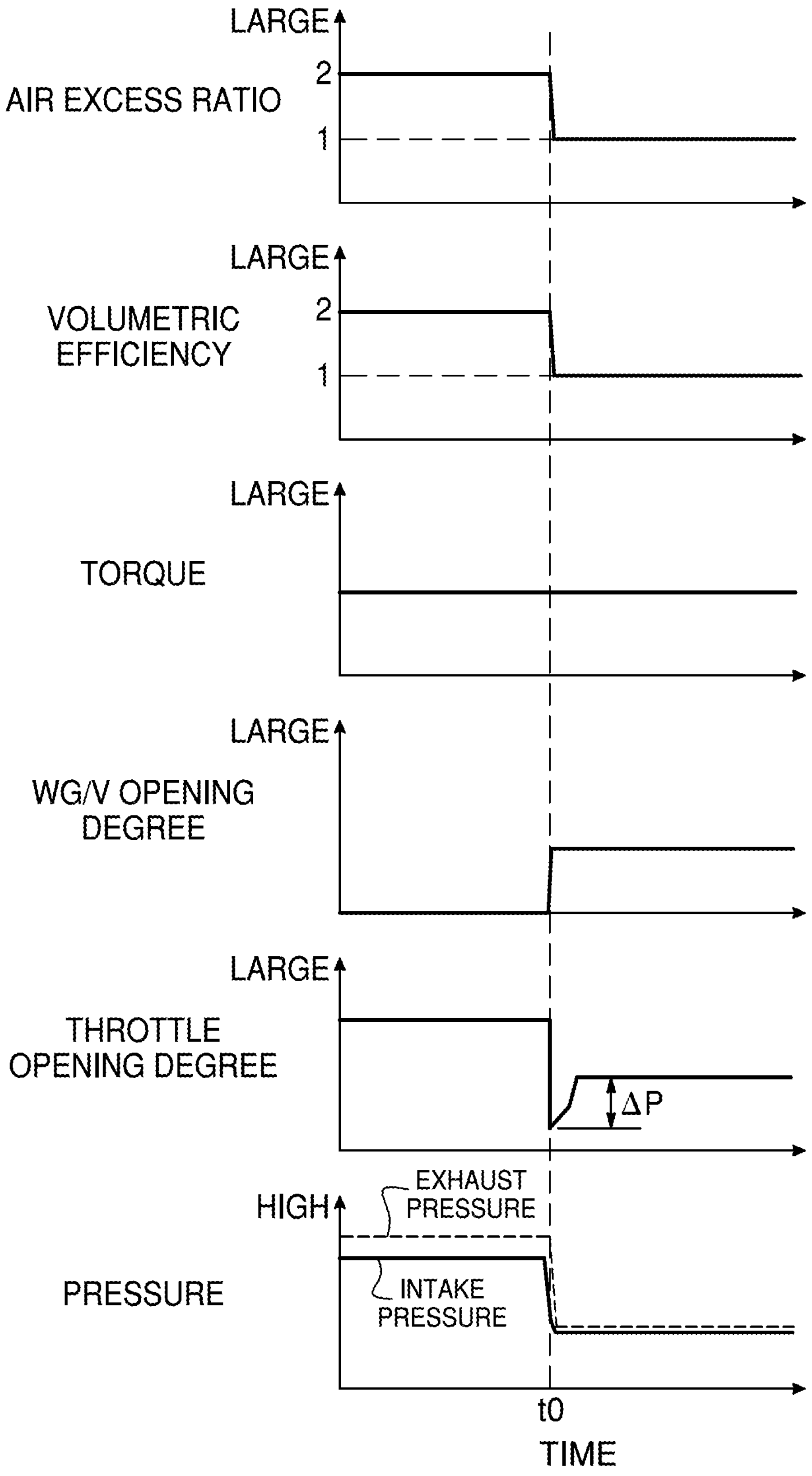
FIG. 4 is a timing chart showing changes in various parameters during the transient period in a first embodiment of the present invention.

In the first embodiment of the present invention, during the transient period in which the operation state is shifted from region B2 in which the air-fuel ratio in the supercharged state becomes a lean air-fuel ratio to region A1 in which the air-fuel ratio in the non-supercharged state becomes an air-fuel ratio richer than the lean air-fuel ratio, as shown in FIG. 4, the opening degree of throttle valve 18 (throttle opening degree) is varied temporarily from the steady-time target throttle valve opening degree in region A1 toward the valve closing side by a predetermined amount $\Delta P$, and is thereafter controlled so as to be the stationary-time target throttle valve opening degree in region A1, such that the intake pressure becomes lower than the exhaust pressure.

That is, in the first embodiment of the present invention, during the transient period in which the operation state is shifted from region B2 to region A1, the air amount in a cylinder is reduced such that the torque overshoot in internal combustion engine 1 does not occur.

FIG. 4 is a timing chart showing changes in parameters during the transient period in which the operation state is shifted from region B2 to region A1, in the first embodiment.

In FIG. 4, the operation state is shifted from region B2 to A1 at the timing of a time t1. Therefore, in FIG. 4, an excess air ratio, the opening degree of waste gate valve 39 (WG/V opening degree) and the throttle opening degree are all changed at the timing of time t1.

By closing throttle valve 18, pressure loss is generated, and thereby the intake pressure becomes lower than the exhaust pressure.

In particular, during the initial stage of the transient period in which the operation state is shifted from region B2 to region A1, the throttle valve opening degree is closed further from the steady-time target throttle valve opening degree in region A1 by the predetermined amount ΔP, the intake pressure becomes smaller than the exhaust pressure surely.

Consequently, during the transient period in which the operation state is shifted from region B2 to region A1, the air amount in a cylinder can be reduced, and unintended overshoot of torque can be suppressed.

Figure 5:
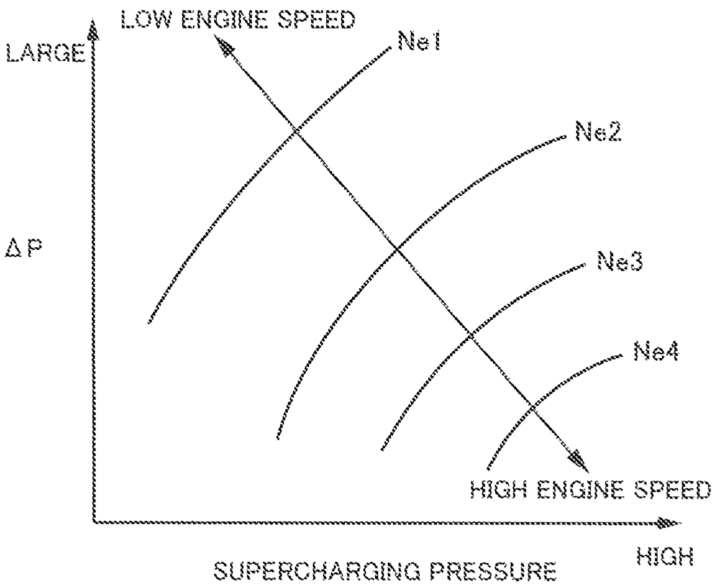
FIG. 5 is an explanatory view schematically showing a map used for calculating a predetermined amount ΔP.

FIG. 5 is one schematically showing a calculation map of the predetermined amount ΔP, to which the predetermined amount ΔP is allocated. This predetermined amount ΔP calculation map is stored in control unit 8.

For example, as shown in FIG. 5, the predetermined amount ΔP is set so as to be larger as the supercharging pressure in region B2 is higher, and is set so as to be smaller as the engine speed of the internal combustion engine in region B2 is higher.

Since the predetermined amount ΔP is set so as to be larger as the supercharging pressure in region B2 is higher, the intake pressure can be sufficiently reduced, and thereby the occurrence of the pump work can be surely suppressed.

Curved lines sloped from left to right in FIG. 5 indicate the relation between the predetermined amount ΔP when engine speeds Ne1 to Ne4 (Ne1<Ne2<Ne3<Ne4) are used as parameters and the supercharging pressure in region B2.

In addition, since gas exchange is enhanced as the engine speed in region B2 increases, and the lowering speed of the intake pressure becomes fast, by setting the predetermined amount ΔP so as to be smaller as the engine speed of the internal combustion engine in region B2 is higher, a pressure loss value generated by closing throttle valve 18 becomes small.

Figure 6:
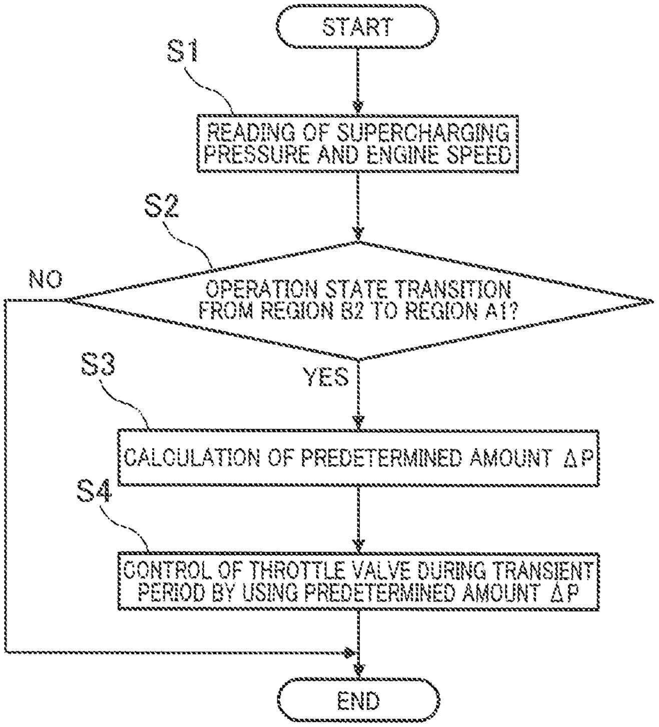
FIG. 6 is a flowchart showing a flow of a control of the internal combustion engine in the first embodiment.

FIG. 6 is a flowchart showing the flow of the control of internal combustion engine 1 in the above-mentioned first embodiment.

In a step S1, the supercharging pressure and the engine speed are read.

In a step S2, it is determined whether or not the operation state is shifted from region B2 to region A1. In step S2, when it is determined that the operation state is shifted from region B2 to region A1, the process proceeds to a step S3. In step S2, when it is not determined that the operation state is shifted from region B2 to region A1, the routine this time is ended.

In step S3, the predetermined amount ΔP is calculated by using the supercharging pressure and the engine speed.

In a step S4, by using the predetermined amount ΔP, the target throttle opening degree during the transient period in which the operation state is shifted from region B2 to region A1 is corrected. That is, during the initial stage of the transient period in which the operation state is shifted from region B2 to region A1, throttle valve 18 is controlled such that the throttle opening degree temporarily becomes smaller than the steady-time target throttle opening degree in region A1 by the predetermined amount ΔP.

In addition, in the above-mentioned first embodiment, although the predetermined amount ΔP is determined in accordance with the supercharging pressure and the engine speed, the predetermined amount ΔP may be calculated by using only one of the supercharging pressure and the engine speed.

In the following, another embodiment of the present invention will be explained. In addition, the same symbols are applied to the same components, and redundant explanation is omitted.

A second embodiment of the present invention will be explained. In the second embodiment, similar to the first embodiment mentioned above, during the transient period in which the operation state is shifted from region B2 to region A1, the air amount control unit is also controlled such that the air amount in a cylinder becomes smaller than the air amount realizing a rich air-fuel ratio. However, the air amount control unit in the second embodiment is not throttle valve 18 but is intake-side variable valve mechanism 10.

During the transient period in which the operation state is shifted from region B2 in which the air-fuel ratio in the supercharged state becomes a lean air-fuel ratio to region A1 in which the air-fuel ratio in the non-supercharged state becomes an air-fuel ratio richer than the lean air-fuel ratio, it can be considered to control the valve closing timing of intake valve 4 by intake-side variable valve mechanism 10 to reduce the air amount in a cylinder.

Figure 7:
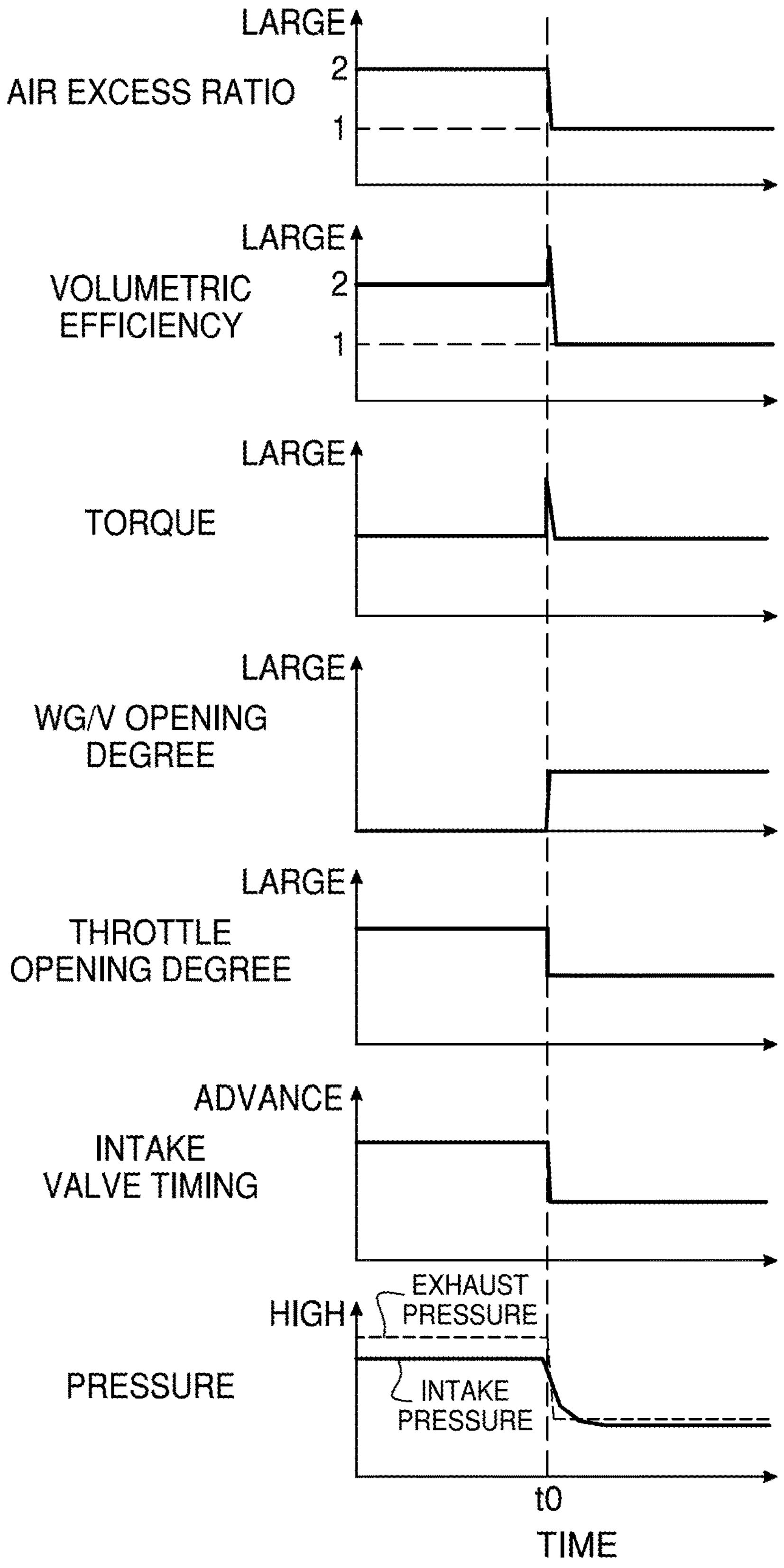
FIG. 7 is a timing chart showing changes in various parameters during the transient period in the comparative embodiment.

Specifically, for example, as shown in FIG. 7, the valve closing timing of intake valve 4 is varied so as to be a target intake valve closing timing at the steady time in region A1, the opening degree of throttle valve 18 (throttle opening degree) is varied toward the valve closing side so as to be a target throttle opening degree at the steady time in region A1, and waste gate valve 39 is fully opened.

FIG. 7 is a timing chart showing changes in various parameters during the transient period in which the operation state is shifted from region B2 to region A1 in a comparative embodiment.

However, in this case, since the supercharging pressure at the time when the operation state is in region B2 remains, the response of the lowering of intake pressure by moving throttle valve 18 to the valve closing direction is delayed with respect to the response of the lowering of exhaust pressure by fully opening waste gate valve 39, and the intake pressure becomes higher than the exhaust pressure.

In this way, when the intake pressure becomes higher than the exhaust pressure during the transient period in which the operation state is shifted from region B2 to region A1, pump work occurs in internal combustion engine 1, and a torque overshoot occurs.

In FIG. 7, at the timing of a time t0, the operation state is shifted from region B2 to region A1. Therefore, in FIG. 7, an excess air ratio, the opening degree of waste gate valve 39 (WG/V opening degree), the throttle opening degree, and the valve timing of intake valve 4 are all changed at the timing of time t0.

In addition, the intake valve closing timing in FIG. 7 is shown, as an example, with a case where the steady-time target intake valve closing timing in region A1 and B2 becomes a timing after the intake bottom dead center.

Figure 8:
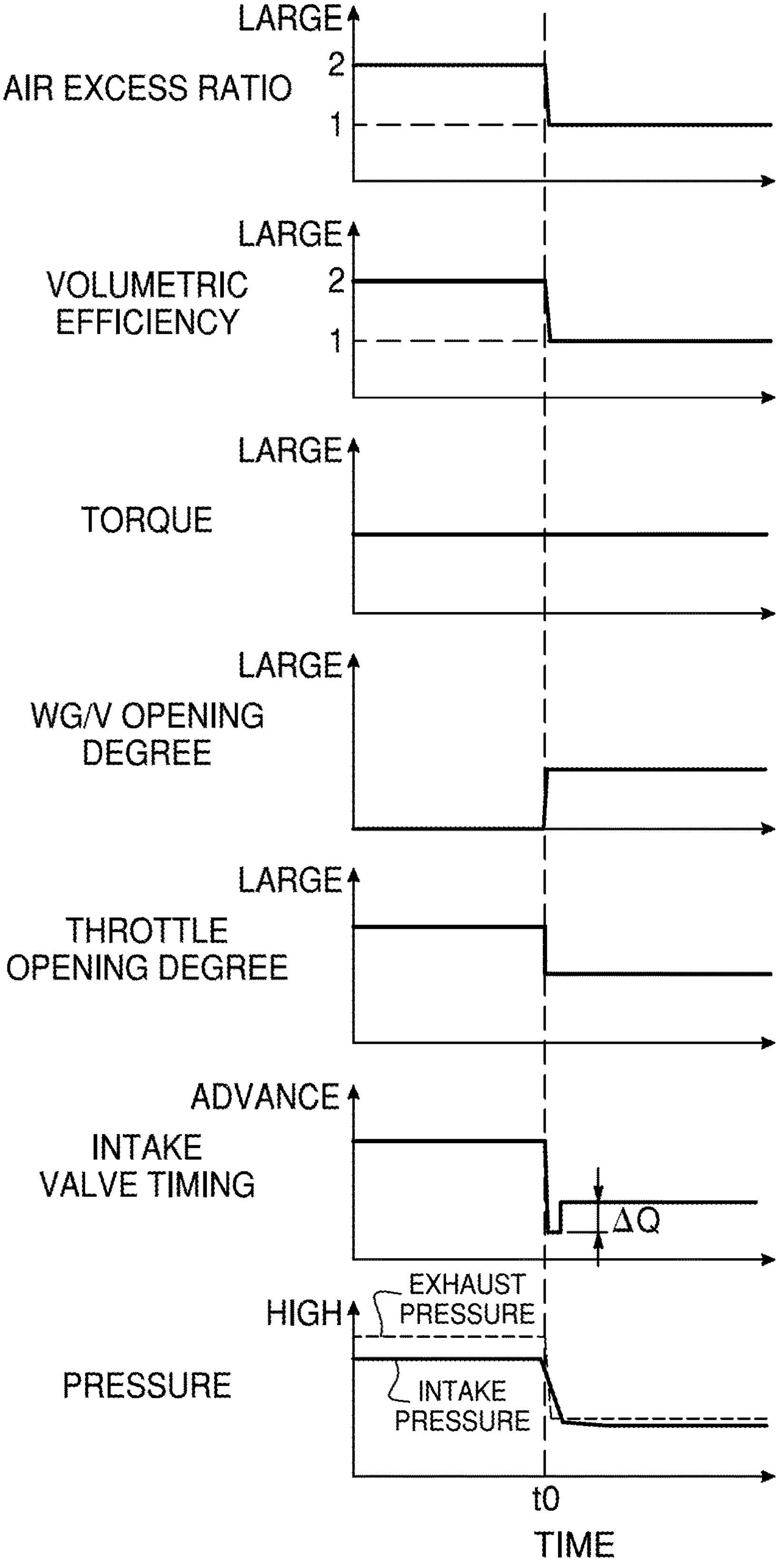
FIG. 8 is a timing chart showing changes in various parameters during the transient period in a second embodiment of the present invention.

In the second embodiment of the present invention, during the transient period in which the operation state is shifted from region B2 in which the air-fuel ratio in the supercharged state becomes a lean air-fuel ratio to region A1 in which the air-fuel ratio in the non-supercharged state becomes an air-fuel ratio richer than the lean air-fuel ratio, as shown in FIG. 8, the intake valve closing timing is controlled to be temporarily varied further from the steady-time intake valve closing timing in region A1 in a direction away from the bottom dead center by a predetermined amount ΔQ, and is thereafter controlled so as to be the steady-time intake valve closing timing in region A1.

In other words, during the transient period in which the operation state is shifted from region B2 to region A1, the intake-side variable valve mechanism 10 temporarily advances or delays the valve timing of intake valve 4 from the stationary-time target intake valve closing timing in region A1 in a direction away from the bottom dead center.

FIG. 8 is a timing chart showing changes in various parameters during the transient period in which the operation state is shifted from region B2 to region A1.

For example, in a case where the steady-time target intake valve closing timing in region A1 is on an advance side from the bottom dead center, during the transient period in which the operation state is shifted from region B2 to region A1, intake-side variable valve mechanism 10 controls the valve timing of intake valve 4 such that the intake valve closing timing is further temporarily advanced from the steady-time target intake valve closing timing in region A1.

In addition, for example, in a case where the steady-time target intake valve closing timing in region A1 is on a delay side from the bottom dead center, during the transient period in which the operation state is shifted from region B2 to region A1, intake-side variable valve mechanism 10 controls the valve timing of intake valve 4 such that the intake valve closing timing is further temporarily delayed from the steady-time target intake valve closing timing in region A1.

That is, in the second embodiment of the present invention, during the transient period in which the operation state is shifted from region B2 to region A1, the air amount in a cylinder is reduced such that the torque overshoot does not occur in internal combustion engine 1.

In FIG. 8, at the timing of a time t1, the operation state is shifted from region B2 to region A1. Therefore, in FIG. 8, an excess air ratio, the opening degree of waste gate valve 39 (WG/V opening degree), the throttle opening degree, and the intake valve closing timing are all changed at the timing of time t1.

In addition, the intake valve closing timing in FIG. 8 is shown, as an example, with a case where the steady-time target intake valve closing timing in region A1 and B2 becomes a timing after the intake bottom dead center.

The intake valve closing timing is set so as to be away (separated) from the intake bottom dead center, and consequently, the amount of the intake air during the transient period in which the operation state is shifted from region B2 to region A1 is reduced, and overshoot of volumetric efficiency can be suppressed.

In particular, during the initial stage of the transient period in which the operation state is shifted from region B2 to region A1, the intake valve closing timing is controlled so as to be temporarily away further from the steady-time target intake valve closing timing in region A1 in the direction away from the bottom dead center by the predetermined amount ΔQ, and thereby overshoot of volumetric efficiency can be suppressed.

Accordingly, during the transient period in which the operation state is shifted from region B2 to region A1, combustion torque is suppressed, and thereby unintended overshoot of torque can be suppressed.

Figure 9:
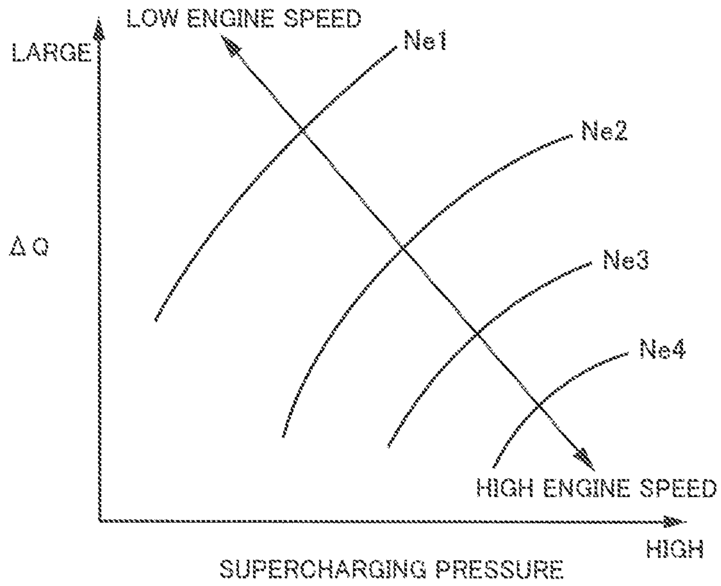
FIG. 9 is an explanatory view schematically showing a map used for calculating a predetermined amount ΔQ.

FIG. 9 is one schematically showing a calculation map of the predetermined amount ΔQ, to which the predetermined amount ΔQ is allocated. This predetermined amount ΔQ calculation map is one stored in control unit 8.

For example, as shown in FIG. 9, the predetermined amount ΔQ is set so as to be larger as the supercharging pressure in region B2 is higher, and is set so as to be smaller as the engine speed of the internal combustion engine in region B2 is higher.

Curved lines sloped from left to right in FIG. 9 indicate the relation between the predetermined amount ΔQ when engine speeds Ne1 to Ne4 (Ne1<Ne2<Ne3<Ne4) are used as parameters and the supercharging pressure in region B2.

Since the predetermined amount ΔQ is set so as to be larger as the supercharging pressure in region B2 is higher, the intake pressure can be sufficiently reduced, and thereby the occurrence of the pump work can be further surely suppressed.

In addition, since gas exchange is enhanced as the engine speed in region B2 increases, and the lowering speed of the intake pressure becomes fast, the predetermined amount ΔQ can be set so as to be smaller as the engine speed of the internal combustion engine in region B2 is higher.

Figure 10:
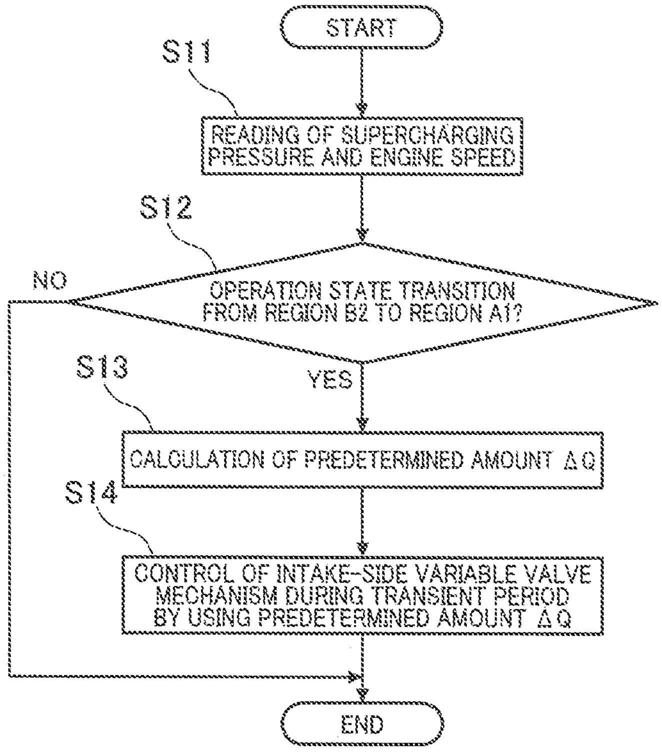
FIG. 10 is a flowchart showing a flow of a control of the internal combustion engine in the second embodiment.

FIG. 10 is a flowchart showing the flow of the control of internal combustion engine 1 in the above-mentioned second embodiment.

In a step S11, the supercharging pressure and the engine speed are read.

In a step S12, it is determined whether or not the operation state is shifted from region B2 to region A1. In step S12, when it is determined that the operation state is shifted from region B2 to region A1, the process proceeds to a step S13. In step S12, when it is not determined that the operation state is shifted from region B2 to region A1, the routine this time is ended.

In step S13, the predetermined amount ΔQ is calculated by using the supercharging pressure and the engine speed.

In a step S14, intake-side variable valve mechanism 10 during the transient period in which the operation state is shifted from region B2 to region A1 is controlled by using the predetermined amount ΔQ. That is, during the initial stage of the transient period in which the operation state is shifted from region B2 to region A1, intake-side variable valve mechanism 10 is configured such that the intake valve closing timing is temporality away from the stationary-time intake valve closing time in region A1 in a direction away from the intake bottom dead center by the predetermined amount ΔQ.

In addition, in the above-mentioned second embodiment, although the predetermined amount ΔQ is determined in accordance with the supercharging pressure and the engine speed, it may be calculated by using only one of the supercharging pressure and the engine speed.

In addition, each of the embodiments mentioned above is one relative to the control method and the control device for internal combustion engine 1.

The invention claimed is:

1. A method for controlling an internal combustion engine including a throttle valve provided in an intake passage as an air amount controller configured to control an air amount in a cylinder, the method comprising:

controlling, during a transient period in which an operation state is shifted from a first operation state in which an air-fuel ratio in a turbocharged state becomes a predetermined lean air-fuel ratio to a second operation state in which the air-fuel ratio in a non-turbocharged state becomes a stoichiometric air-fuel ratio richer than the predetermined lean air-fuel ratio, the air amount in the cylinder so as to be an air amount smaller than an air amount realizing the stoichiometric air-fuel ratio by reducing the air amount in the cylinder, controlling, during the transient period, a throttle opening degree of the throttle valve such that an intake pressure becomes lower than an exhaust pressure, controlling, during the transient period, the throttle valve such that the throttle opening degree is varied toward a valve closing side further from a steady-time target throttle opening degree in the second operation state by a predetermined amount, and thereafter becomes the steady-time target throttle opening degree in the second operation state, and setting the predetermined amount so as to be larger as a turbocharging pressure in the first operation state is higher.

2. The method for controlling the internal combustion engine according to claim 1, wherein the predetermined amount is set so as to be smaller as an engine speed of the internal combustion engine in the first operation state is higher.

3. A device for controlling an internal combustion engine, comprising:

a turbocharger;

a throttle valve provided in an intake passage as an air amount controller configured to control an air amount in a cylinder; and a controller configured to control the air amount controller, wherein during a transient period in which an operation state is shifted from a first operation state in which an air-fuel ratio in a turbocharged state becomes a predetermined lean air-fuel ratio to a second operation state in which the air-fuel ratio in a non-turbocharged state becomes a stoichiometric air-fuel ratio richer than the predetermined lean air-fuel ratio, the controller is configured to control the air amount controller such that the air amount in the cylinder becomes an air amount smaller than an air amount realizing the stoichiometric air-fuel ratio by reducing the air amount in the cylinder, wherein during the transient period, a throttle opening degree of the throttle valve is controlled such that an intake pressure becomes lower than an exhaust pressure, wherein during the transient period, the throttle valve is controlled such that the throttle opening degree is varied toward a valve closing side further from a steady-time target throttle opening degree in the second operation state by a predetermined amount, and thereafter becomes the steady-time target throttle opening degree in the second operation state, and wherein the predetermined amount is set so as to be larger as a turbocharging pressure in the first operation state is higher.

* * * * *